June 15, 1937.   F. D. WILLIAMS, JR   2,084,117
RECTIFIER OUTPUT VOLTAGE REGULATOR
Filed Dec. 1, 1936
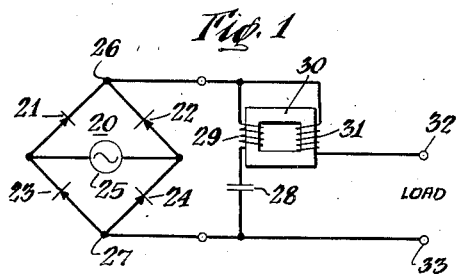
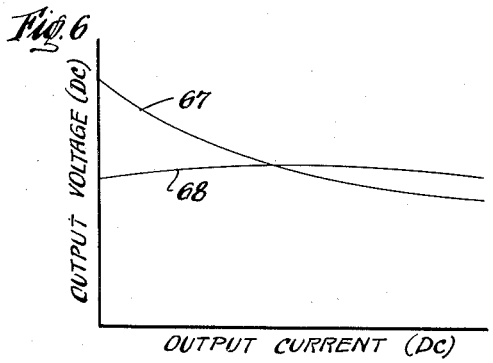
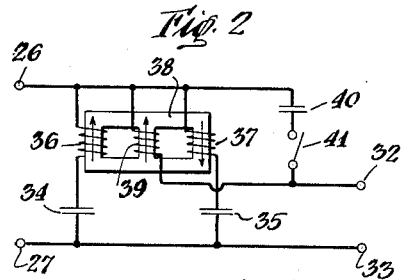
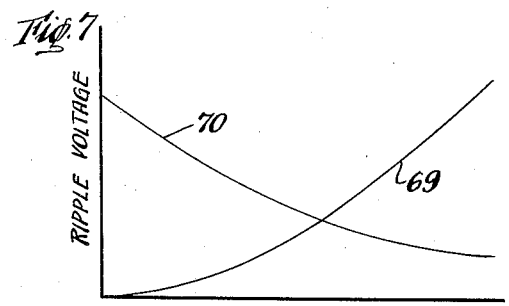
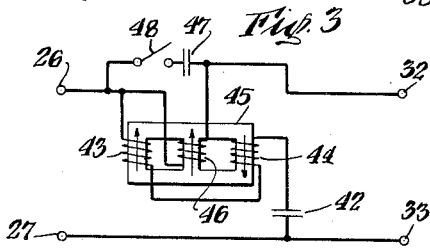
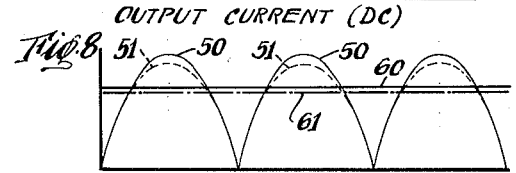
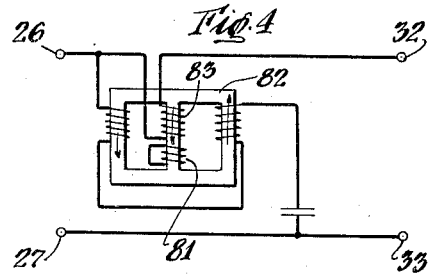
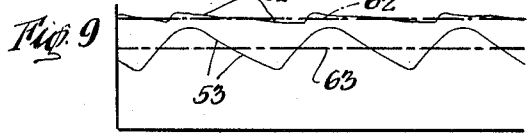
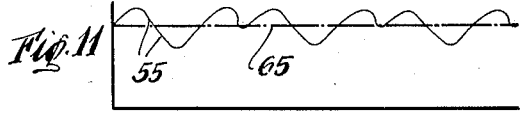
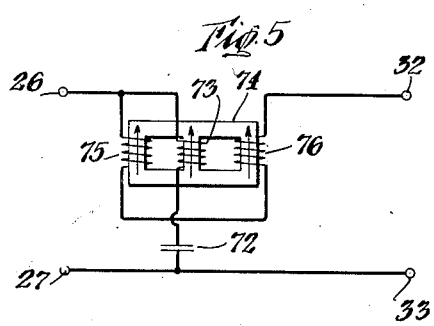
INVENTOR
Fred D. Williams, Jr.
BY
ATTORNEY Patented June 15, 1937

2,084,117

UNITED STATES PATENT OFFICE 2,084,117

RECTIFIER OUTPUT VOLTAGE REGULATOR

Fred D. Williams, Jr., New Rochelle, N. Y., assignor to Ruben Rectifier Corporation, New Rochelle, N. Y., a corporation of Delaware Application December 1, 1936, Serial No. 113,618

15 Claims. (Cl. 175—363)

This invention relates to voltage control circuits for rectifiers.

An object of the invention is to improve the voltage characteristics of a rectifier system.

Another object is to improve the voltage regulation of a rectifier system by regulating means associated with the output circuit of the system.

A further object is to improve the output currents of a rectifier system to render them adaptable to complete filtering without sacrifice of voltage regulating characteristics.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a circuit diagram of a rectifier system embodying features of the present invention;

Figure 2 shows a modification of the circuit;

Figure 3 shows a further improvement;

Figure 4 illustrates a still further modification;

Figure 5 shows a further modification;

Figure 6 is a graph illustrating the voltage regulation obtained by the present invention compared with a conventional filter circuit;

Figure 7 is a graph illustrating the improvement in ripple voltage characteristics obtained by the present invention; and Figures 8 to 12 illustrate graphically the output voltage of the rectifier system under certain conditions.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

In alternating current rectifying systems the voltage and current alternations in the A. C. circuit are converted by the rectifying device or devices into a pulsating direct current in the D. C. output circuit. With a full-wave rectifier, for example, the unfiltered D. C. output voltage will comprise a series of half waves wherein during each half cycle the voltage increases from zero to a maximum value and decreases again to zero. The average D. C. voltage of the output circuit, in other words the voltage which would be read upon a D. C. voltmeter connected across the output will be somewhat less, of course, than the maximum voltage reached during each half cycle.

The average voltage can be enhanced by connecting a capacitance across the rectifier output. However, a simple capacitance, while increasing the voltage output both under load and no-load conditions, is more effective when no load current is being supplied by the circuit, than under load conditions when a current is being drawn. In other words, the average voltage will vary considerably between load and no-load conditions.

According to the present invention this undesirable drop in output voltage when load is applied may be eliminated. This is accomplished, according to the invention, by the use of inductances connected in the output circuit in such a manner as to limit the effect of the condenser as a function of the amount of load current being drawn.

Referring to the drawing, Figure 1 shows a rectifier circuit having voltage regulating means arranged according to one form of the invention. The rectifier itself comprises the usual form of bridge circuit 20 having four arms containing rectifiers 21, 22, 23, and 24, respectively. The rectifier bridge is fed by an A. C. source 25 connected to two opposite corners of the bridge circuit, the rectifiers being so oriented as to supply a D. C. potential across the two remaining corners 26 and 27 of the bridge.

A capacitance (or condenser) 28 is connected across the output terminals 26 and 27 of the rectifier bridge and has in series with it a choke coil winding 29. Coil 29 is wound on one leg of a closed iron core 30. A second coil winding 31 is wound on the other leg of the core 30 and is connected in circuit between terminal 26 of the rectifier bridge and output terminal 32 of the rectifier system. The second output terminal 33 of the rectifier system is connected directly to terminal 27 of the bridge.

If A. C. is supplied to the rectifier with no load connected to the output terminals of the system a pulsating D. C. voltage will be produced across terminals 26 and 27 and capacitance 28 will be charged to a potential substantially equal to the average output voltage of the rectifier. However, due to the high inductive effect of choke coil 29 only part of the capacitance is made available to raise the average voltage of the rectifier output. Upon connecting a load across output terminals 32—33 the load current will flow through coil winding 31 in series with the load. This winding being on the same closed iron core 30 as winding 29, increases the magnetic flux in iron core 30 and thereby increases the degree of saturation of the core. With increasing saturation the impedance of winding 29 will will be decreased thereby increasing the availability of capacitance 28 for raising the average voltage of the output. As a result of the co-operation of capacitance 28 and windings 29 and 31 the drop in voltage between no-load and load conditions is minimized or eliminated. The reason for this will appear more in detail later.

Figure 2 shows a modification of the voltage control circuit in which two capacitances 34 and 35 are individually connected across the output circuit, capacitance 34 having an inductive winding 36 in series with it and capacitance 35 having an inductive winding 37 in series with it. Coils 36 and 37 are wound on the end legs of a three-leg closed iron core 38. A third coil 39 is wound on the center leg of the core and connected between rectifier terminal 26 and output terminal 32 so as to be in series with the output circuit. A third capacitance 40 is adapted to be connected in shunt with coil winding 39 by switch 41. The windings 36 and 37 are wound in such direction that the charging currents flowing to capacitances 34 and 35 will produce flux in the same direction around the rim of iron core 38.

With no load connected to the output of the circuit of Figure 2 the capacitances 34 and 35 are limited in their effect on the voltage across the output circuit due to the limiting action of inductive coil windings 36 and 37. However, when load is applied so that current passes through center winding 39 the flux in iron core 38 approaches saturation thereby reducing the impedance of coils 36 and 37 and rendering the capacitances 34 and 35 of greater and greater effectiveness in enhancing the output voltage with increasing load currents. The circuit in Figure 2 has an advantage over the circuit of Figure 1 in that the current alternations in the two outside windings will have substantially no effect on the flux passing through the center leg of the core 38 and thus the current alternations in the capacitance circuits can not introduce ripple currents in the output circuit.

Capacitance 40 introduces another improvement. When this is connected in shunt with winding 39 by closing switch 41 the impedance of winding 39 is materially reduced.

Figure 3 shows the preferred form of circuit for most purposes and particularly for the output for dry disc rectifier devices. This circuit comprises capacitance 42 connected in series with choke coil windings 43 and 44 across the rectifier terminals. Coils 43 and 44 are wound on the end legs respectively of a three-leg closed iron core 45 and the direction of winding is such that charging current flowing to capacitance 42 will produce aiding flux around the outside of core 45 (same as with Figure 2). A third winding 46 on the center leg of core 45 is connected in series with the output circuit between rectifier terminal 26 and output terminal 32 as heretofore. A second capacitance 47 is adapted to be connected in shunt with winding 46 by switch 48.

Figure 4 shows a modification in which a short circuited winding 81 is provided on the middle leg of three-legged core 82 instead of providing a capacitance in shunt with the output circuit coil 83 which is wound on the middle leg of the core. Short circuited winding 81 reduces the impedance of coil 83.

Figure 5 shows another form of circuit in which capacitance 72 is connected in series with choke coil 73 wound on the middle leg of three-legged core 74 and the outer windings 75 and 76 are both connected in series with the output circuit. The coil windings 75 and 76 are preferably so wound as to produce opposing fluxes around the edge of the core 74. The flux will thereby be concentrated in the middle leg of the core when load current is flowing, thus producing a higher degree of saturation in the core about which coil 73 is wound with resulting accentuation of the control obtained but with some possible adverse effects on wave form.

It will be obvious that the polarity of the coil connections may be reversed from that described for certain applications or to achieve certain desired results. Likewise, in many instances certain of the coils can be connected in parallel instead of in series. It is also obvious that the regulator elements may be multiplied by connecting similar or different elements in series or parallel in the output.

At this point we may digress from the description to bring out more fully the theory of operation of the circuits of the present invention. Consider first the appearance of the output voltage wave across terminals 26—27 with no regulating elements in the output circuit and no load connected to the output. The no-load voltage will comprise a series of half-wave forms 50 as shown in the graph of Figure 3. It will be noted that the voltage rises from substantially zero during each half cycle and again returns to zero. The average voltage 60 measured by a D. C. voltmeter, will, of course, be somewhat less than the maximum voltage during a cycle. The height of average voltage curve 60 will be equal to the average height of the ordinate of the curve.

If a load is connected across the output of this simple circuit having no regulating devices the voltage curve will remain substantially the same except for a slight decrease in the height of the curve due to resistance drop in the rectifier and supply line. The load voltage may be represented by curve 51 and the average load voltage by curve 61 (Figure 8).

Now consider the effect of connecting a capacitance (or condenser) across the output terminals. With no load connected to the output the condenser will be charged immediately to the maximum voltage of the output wave and will then continuously maintain this maximum voltage across the output. The voltage curve will then appear as a substantially horizontal line 52 as shown in Figure 9 except for a slight decay during each half cycle because of leakage. It will be noted that the average voltage curve 62 of the output has been considerably raised by the addition of the capacitance.

If a load is connected across the output of the rectifier having the capacitance in shunt with it the voltage decay during each half cycle will be increased so that the curve will have substantially the appearance of curve 53 in Figure 9. It will be noted, however, that the voltage doesn't decrease to zero at any time during a cycle. The average voltage, represented by curve 63, while lower than the no-load average, still is higher than the average voltage obtained when no capacitance is used.

The objection to the use of the capacitance alone across the output is apparent. There is too great a drop in average voltage of the output in going from no load to load conditions. By the present invention this disadvantage is overcome.

The result obtained by the circuit of Figure 3 will afford an example.

With the circuit of Figure 3 under no-load conditions and with switch 48 open the voltage curve may be substantially as shown in curve 54 of Figure 10. It can be seen that choke coils 43 and 44, by their inductive impedance, retard the charging and discharging of the capacitance. Curve 64, representing the average voltage of the output is raised to some extent by the operation of the capacitance in alternately storing energy from the rectifier and discharging it into the load circuit but the full voltage raising ability of the condenser is not utilized.

If a load equal to the rated capacity of the rectifier is now connected across the output terminals of the circuit of Figure 3 the voltage variations will change somewhat in shape but the average voltage will remain substantially the same as seen from curve 55 of Figure 11 which represents the instantaneous output voltage of the circuit of Figure 3 under load conditions and curve 65 which represents the average output voltage. This improvement in voltage maintenance results from the fact that the D. C. load current flowing through middle coil winding 46 increases the flux density or degree of saturation in core 45 thereby decreasing the impedance of the coil windings 43 and 44 so that their limiting effect upon the alternate charging and discharging currents flowing to capacitance 42 is reduced.

When switch 48 is closed a further improvement is noted under load conditions. The instantaneous output voltage may then have a wave form similar to that shown in curve 56 of Figure 12. The ripple current is substantially a sine wave of about six times the frequency of the original alternating current input. The average output voltage is represented by curve 66.

Figure 6 is a graph showing the D. C. voltage versus D. C. current curves for rectifier circuits with and without the improvements of the present invention. Curve 67 represents the D. C. voltage output with various load currents in a circuit having only a conventional filter circuit in the output of the rectifier, the filter comprising choke coils in series with the output conductors and capacitances bridged across the output conductors. It will be noted that there is a marked drop in output voltage with increasing loads. Curve 68 represents the D. C. output at various loads in a circuit embodying the present invention. Here it can be seen that the voltage output is substantially constant regardless of load. In fact, the rated full load voltage can, by proper selection of the circuit elements, be made to equal exactly the no-load voltage.

Curves 55 and 56 (Figures 11 and 12) indicate a decided improvement in ripple frequency in addition to the improved voltage regulation already discussed. As will be noted from Figures 8 to 12, inclusive, the frequency of the ripple current in the output circuit is increased by adding the improvements of the present invention. The original D. C. output shown in Figure 8 has a ripple frequency of about twice the frequency of the A. C. input. For example, if the input frequency is 60 cycles per second the output ripple frequency would be 120 cycles per second. With the circuit of Figure 3 when switch 48 is open the ripple frequency, as shown in curve 55 of Figure 12, may be approximately 240 cycles per second. By closing switch 48 so as to add capacitance 47 the ripple frequency is further increased to substantially 360 cycles per second as shown in curve 56 of Figure 12. It is well-known that these higher ripple frequencies are much easier to filter out of a D. C. system than the lower frequencies.

Figure 7 is a graph representing the ripple voltage versus D. C. output current in rectifier circuits with and without the use of the present invention. The ripple voltage is taken to be proportional to the maximum height of the instantaneous wave above the average voltage curve such as the maximum height of curve 56 above curve 66 in Figure 12. Curve 69 shows the ripple voltage as a function of output current for a rectifier system having a conventional filter circuit in the output, the voltage being measured across the output of the first stage of the conventional filter. It can be noted that the ripple voltage increases with increasing load thus making adequate filtering more and more difficult as heavier loads are drawn. Curve 70 shows the ripple voltage across the output of voltage regulator of the present invention when it is substituted for the first filter stage. Note how the ripple voltage is at its highest at no load where filtering is relatively easy and that the ripple decreases materially with increasing loads.

By the present invention it is thus possible to reduce the drop in average voltage between no load and load conditions and it is even possible to so select the circuit elements as to produce a load voltage equal to or greater than the no load voltage depending upon what is desired.

As an example of what improvement may be obtained by the present invention the following table represents the measured output voltage of a rectifier system arranged according to the present invention under conditions of no load, one ampere load and two ampere load as compared with the voltage output of a rectifier under these conditions without the regulator means and also with a simple capacitance connected across the rectifier output terminals.

| Load current D. C. amperes | No regulator (D. C. volts) | Capacitance only (D. C. volts) | With regulator (D. C. volts) |
|---|---|---|---|
| 0 | 13.4 | 22.0 | 15.2 |
| 1 | 12.6 | 18.6 | 16.8 |
| 2 | 12.0 | 16.3 | 16.2 |

The present invention is particularly applicable to dry disc rectifier devices but in some instances may be used with tube rectifiers.

The rectifier system, thus regulated, is made suitable for many applications where rectified D. C. power supplies have formerly been unsatisfactory. For example, in telephone work where considerably less than one-tenth volt ripple is permissible, the system here proposed in conjunction with standard filter components will perform satisfactorily. It is also suitable for filament supply systems and general applications.

In addition to the advantages derived from voltage regulation the system provides a ripple voltage that decreases in amplitude and increases in frequency with increasing load thereby making filtering relatively simple.

As is apparent from the above description applicant provides a rectifier system having a higher voltage in the D. C. output circuit, the voltage being practically independent of the load current being drawn and unaffected by the addition of further filter circuits. Also the ripple currents have been converted into a form convenient for filtering.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. In a rectifier system, an A. C. input circuit, a rectifier and a D. C. output circuit, a series arrangement of capacitance and inductance connected across said output circuit and means in said output circuit for varying the value of said inductance responsive to the current in said output circuit.

2. In a rectifier system, an A. C. input circuit, a rectifier and a D. C. output circuit, a series arrangement of capacitance and inductance connected across said output circuit and means in said output circuit for decreasing the value of said inductance responsive to an increase in the current in said output circuit.

3. In a rectifier system, an A. C. input circuit, a rectifier and a D. C. output circuit, a series arrangement of capacitance and inductance connected across said output circuit and a second inductance in said output circuit arranged so as to decrease the inductive value of said first named inductance responsive to an increase in the current in said output circuit.

4. In a rectifier system, an A. C. input circuit, a rectifier and a D. C. output circuit, a series arrangement of capacitance and inductance connected across said output circuit, a paramagnetic core for said inductance, and a second inductance connected in said output circuit and arranged so as to vary the saturation of said core responsive to current in said output circuit.

5. In a rectifier system, an A. C. input circuit, a rectifier and a D. C. output circuit, a series arrangement of capacitance and inductance connected across said output circuit, and a second inductance connected in said output circuit, and a common paramagnetic core for both said inductances.

6. In a rectifier system, an A. C. input circuit, a rectifier and a D. C. output circuit, a series arrangement of capacitance and inductance connected across said output circuit, and a second inductance connected in said output circuit, and a common paramagnetic core for both said inductances, said second inductance thereby being adapted to increase the saturation of said core with an increase in D. C. output current.

7. In a rectifier system, an A. C. input circuit, a rectifier and a D. C. output circuit, a series arrangement of capacitance and inductance connected across said output circuit, and a second inductance connected in said output circuit, and a common closed iron core for both said inductances, said second inductance thereby being adapted to increase the saturation of said core with an increase in D. C. output current whereby the inductance impedance of said first mentioned inductance will be decreased with increase in D. C. output current.

8. In a rectifier system, an A. C. input circuit, a rectifier and a D. C. output circuit, a series arrangement of capacitance and inductance connected across said output circuit, and a second inductance connected in said output circuit, and a common paramagnetic core for both said inductances, and means associated with said second inductance for decreasing the A. C. impedance thereof.

9. In a rectifier system, an A. C. input circuit, a rectifier and a D. C. output circuit, a series arrangement of capacitance and inductance connected across said output circuit, and a second inductance connected in said output circuit, and a common paramagnetic core for both said inductances, and a second capacitance connected in shunt with said second inductance.

10. In a rectifier system, an A. C. input circuit, a rectifier and a D. C. output circuit, a series arrangement of capacitance and inductance connected across said output circuit, and a second inductance connected in said output circuit, and a common paramagnetic core for both said inductances, said inductances being arranged on said core so as to prevent transformer action between said first mentioned inductance and said second inductance.

11. In a rectifier system, an A. C. input circuit, a rectifier and a D. C. output circuit, a series arrangement of capacitance and two inductances connected across said output circuit, and a third inductance connected in series with said output circuit and a three-legged closed paramagnetic core, said two first mentioned inductances being wound on the respective end legs of said core and said third inductance being wound on the middle leg of said core.

12. In a rectifier system, an A. C. input circuit, a rectifier and a D. C. output circuit, a series arrangement of capacitance and two inductances connected across said output circuit, and a third inductance connected in series with said output circuit and a three-legged closed paramagnetic core, said two first mentioned inductances being wound on the respective end legs of said core and said third inductance being wound on the middle leg of said core, said two first mentioned inductances being connected to produce aiding flux around the periphery of said core.

13. In a rectifier system, an A. C. input circuit, a rectifier and a D. C. output circuit, a series arrangement of capacitance and two inductances connected across said output circuit, and a third inductance connected in series with said output circuit and a three-legged closed paramagnetic core, said two first mentioned inductances being wound on the respective end legs of said core and said third inductance being wound on the middle leg of said core, and a second capacitance connected in shunt with said second inductance.

14. A voltage enhancing circuit for pulsating direct current comprising a D. C. circuit supplied with pulsating direct current, a series arrangement of capacitance and inductance connected across said circuit, a second inductance connected in series with said circuit and a paramagnetic core common to both said inductances whereby said second inductance will decrease the inductive impedance of said first mentioned inductance with increasing D. C. flow in said circuit.

15. In a rectifier system, an A. C. input circuit, a rectifier and a D. C. output circuit, a series arrangement of capacitance and inductance connected across said output circuit and means in said output circuit for increasing the effect of said capacitance responsive to an increase in the current in said output circuit.

FRED D. WILLIAMS, Jr.

DISCLAIMER 2,084,117.—*Fred D. Williams, Jr.*, New Rochelle, N. Y. RECTIFIER OUTPUT VOLTAGE REGULATOR. Patent dated June 15, 1937. Disclaimer filed November 8, 1938, by the assignee, *Ruben Rectifier Corporation*.

Hereby enters this disclaimer to claims 1, 2, 3, 4, 5, 6, 7, 14, and 15.

[*Official Gazette December 6, 1938.*]